(12) United States Patent
Yanagita

(10) Patent No.: US 10,627,796 B2
(45) Date of Patent: Apr. 21, 2020

(54) RETRIEVAL SYSTEM AND RETRIEVAL METHOD

(71) Applicant: FANUC CORPORATION, Yamanashi (JP)

(72) Inventor: Akihiro Yanagita, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 48 days.

(21) Appl. No.: 15/841,369

(22) Filed: Dec. 14, 2017

(65) Prior Publication Data

US 2018/0181097 A1   Jun. 28, 2018

(30) Foreign Application Priority Data

Dec. 22, 2016   (JP) ................................. 2016-249975

(51) Int. Cl.
| | |
|---|---|
| G06F 16/00 | (2019.01) |
| G05B 19/042 | (2006.01) |
| G05B 19/418 | (2006.01) |
| G06Q 50/08 | (2012.01) |
| G06F 16/9032 | (2019.01) |

(52) U.S. Cl.
CPC ..... *G05B 19/0426* (2013.01); *G05B 19/4183* (2013.01); *G06F 16/90328* (2019.01); *G06Q 50/08* (2013.01); *G05B 2219/31088* (2013.01); *G05B 2219/31291* (2013.01);
(Continued)

(58) Field of Classification Search
CPC .................................................. G06F 16/2455
See application file for complete search history.

(56) References Cited

U.S. PATENT DOCUMENTS

| | | |
|---|---|---|
| 6,810,360 B2 | 10/2004 | Fujishima et al. |
| 2003/0065481 A1 | 4/2003 | Fujishima et al. |

(Continued)

FOREIGN PATENT DOCUMENTS

| | | |
|---|---|---|
| CN | 101149619 A | 3/2008 |
| CN | 106020138 A | 10/2016 |

(Continued)

OTHER PUBLICATIONS

Kikuchi, Tamaki; Improvement and Competitive Edge Enhancement of Production Site, Monthly Automatic Recognition, Japan, Japan Industrial Publishing Co., Ltd. 2008 Apr. 10, vol. 21, No. 5, pp. 4-8.

(Continued)

*Primary Examiner* — Hung Q Pham
(74) *Attorney, Agent, or Firm* — Studebaker & Brackett PC

(57) ABSTRACT

Information representing an operating state of each of a plurality of robots, etc. operating under different operation conditions are retrieved and outputted. A retrieval system (1) includes; an acquisition means (24) for acquiring, from a plurality of machines (25) being used under respectively different operation conditions, information representing an operating state of each of the plurality of machines; an accumulation means (13) for accumulating information representing a plurality of operating states thus acquired; and a search means (12) for accepting search criteria for searching the information accumulated in the accumulation means (13), retrieving information representing an operating state agreeing with the search criteria from the accumulation means (13), and outputting a search result.

8 Claims, 7 Drawing Sheets

(52) U.S. Cl.
CPC .............. *G05B 2219/31325* (2013.01); *G05B 2219/31336* (2013.01); *Y02P 90/10* (2015.11); *Y02P 90/18* (2015.11)

(56) References Cited

U.S. PATENT DOCUMENTS

| | | |
|---|---|---|
| 2011/0144795 A1 | 6/2011 | Liu et al. |
| 2012/0197911 A1 | 8/2012 | Banka et al. |
| 2016/0054718 A1 | 2/2016 | Nakagawa et al. |
| 2017/0261403 A1 | 9/2017 | Hiruta et al. |

FOREIGN PATENT DOCUMENTS

| | | |
|---|---|---|
| JP | H10-161718 A | 6/1998 |
| JP | H10-328976 A | 12/1998 |
| JP | 2004-030061 A | 1/2004 |
| JP | 4031627 B2 | 1/2008 |
| JP | 4196495 B2 | 12/2008 |
| JP | 2016-057803 A | 4/2016 |

OTHER PUBLICATIONS

An Office Action mailed by the Japanese Patent Office dated May 15, 2018, which corresponds to Japanese Patent Application No. 2016-249975 and is related to U.S. Appl. No. 15/841,369.

An Office Action mailed by the Chinese Patent Office dated Dec. 28, 2018, which corresponds to Chinese Patent Application No. 201711384285.3 and is related to U.S. Appl. No. 15/841,369; with English language translation.

An Office Action issued by the German Patent Office dated Apr. 8, 2019, which corresponds to German Patent Application No. 10 2017 011 294.0 and is related to U.S. Appl. No. 15/841,369; with partial English translation.

RETRIEVAL SYSTEM AND RETRIEVAL METHOD

This application is based on and claims the benefit of priority from Japanese Patent Application No. 2016-249975, filed on 22 Dec. 2016, the content of which is incorporated herein by reference.

BACKGROUND OF THE INVENTION

Field of the Invention

The present invention relates to a retrieval system and retrieval method for performing retrieval, and particularly relates to a retrieval system and retrieval method for performing retrieval of operating information of machines.

Related Art

A designer of an industrial robot or machine tool (hereinafter referred to as "robot, etc.") is required to perform design so that the conflicting demands are satisfied, such as satisfying sufficient strength and operating performance in order to allow the robot, etc. to appropriately operate, along with making as light weight and energy efficient as possible.

In order to satisfy these conditions, the designer is required to design the rigidity of the arms, sizes of gears and motors, etc. by considering the operation conditions of the robot, etc. Herein, operation conditions of robot, for example, are according to what kind of movements (e.g., speed, acceleration, movement distance, axis direction) the robot, etc. is operating, how much load the robot, etc. is required to withstand during this operation (e.g., upon this movement, the motor and gears driving each axis of the robot must withstand a certain load and duty ratio), etc.

Such operation conditions of the robot, etc. come to greatly differ depending on according to what kind of application software (hereinafter referred to as "application") the robot, etc. is utilized.

Therefore, as a procedure upon designing a robot, etc., first, the application for utilizing this robot, etc. is specified, and the operation conditions of the robot, etc. believed to be representative in this application are assumed. Next, design is performed so as to achieve the most weight savings and energy economization as possible, while keeping as rugged a casing and power unit that can exhibit the performance required under these assumed operation conditions. Then, after creating a prototype model by design, the prototype model is made to operate under the assumed operation conditions in a laboratory, and the operating state such as the applied load, speed, acceleration, torque and duty ratio are measured in practice. It is thereby confirmed that the expected performance can be exhibited, and that gears/motors/arms, etc. are not damaged, and overheating, etc. does not occur.

Examples of technology for performing such confirm are disclosed in Patent Document 1. With the technology disclosed in Patent Document 1, sensors, etc. are installed to a machine tool including a numerical control device. Then, by causing the motion mechanism of the machine tool to function, and measuring the operating state of the motion mechanism with sensors, etc., the performance of the motion mechanism is evaluated.

Patent Document 1:
Japanese Patent No. 4031627

SUMMARY OF THE INVENTION

According to the technology, etc. of the disclosure of Patent Document 1, it is possible to confirm whether or not the robot, etc. is appropriately operating under the assumed operation conditions as mentioned above.

However, the assumption of the operation conditions serving as the premise for performing confirmation has a large portion relying on the skill and intuition of the design engineer. For this reason, this assumption has not necessarily been accurate.

Herein, a problem will not arise if the assumed operation conditions agree well with the actual operation conditions for use in a factory, etc., since it will be a robot, etc. of high performance having good balance in design of the robot, etc.

In contrast, in the case of the assumed operation conditions clashing and diverging from the actual operation conditions in use at the factory, etc., there have been problems in that the mechanical unit becomes heavier than needed, the motor and/or gears become excessive, and the performance deteriorates. In addition, even if the performance is sufficient, there may have been problems caused such as damaging before the conventional design lifespan due to the rigidity of the mechanical unit being insufficient and not withstanding use in the application, becoming a design in which damage to gears or overheating of motors tends to occur, etc.

Therefore, the present embodiment has the object of providing a retrieval system and retrieval method capable of retrieving and outputting information representing the operating state of each of a plurality of robots, etc. operating under different operation conditions.

A retrieval system according to a first aspect of the present invention (e.g., the retrieval system 1 described later) includes: an acquisition means (e.g., the factory management system 24 described later) for acquiring, from a plurality of machines (e.g., the machine 25 described later) being used under respectively different operation conditions, information representing an operating state of each of the plurality of machines; an accumulation means (e.g., the statistical information database 13 described later) for accumulating information representing a plurality of the operating states thus acquired; and a search means (e.g., the user interface supply unit 143) for accepting search criteria for searching the information accumulated in the accumulation means (e.g., the statistical information acquisition unit 141 described later), retrieving information representing an operating state agreeing with the search criteria from the accumulation means (e.g., the statistical information management device 12 described later), and outputting a search result.

According to a second aspect of the present invention, the retrieval system as described in the first aspect may be configured so as to further include: a management means (e.g., the machine information pre-processor 22 described later) for requesting information representing the operating state agreeing with the search criteria to the machine, in a case of information representing an operating state agreeing with the search criteria not being accumulated in the accumulation means, as a result of a search by the search means, in which the management means, in a case of receiving information representing an operating state agreeing with the search criteria as a response to the request from the machine, causes the information representing the operating state to be outputted to the search means.

According to a third aspect of the present invention, in the retrieval system as described in the second aspect, it may be configured so that the machine having received the request from the management means generates information representing an operating state agreeing with the search criteria, based on operation of said machine performed after receiving the request, and sends the operating state thus generated to the management means as a response to the request.

According to a fourth aspect of the present invention, in the retrieval system as described in any one of the first to third aspects, it may be configured so that criterion for retrieving information produced by collecting statistics of information representing the operating state of the plurality of machines is included in the search criteria.

According to a fifth aspect of the present invention, in the retrieval system as described in any one of the first to fourth aspects, it may be configured so that criterion for retrieving information representing operating information along a time series of a specific machine is included in the search criteria.

According to a sixth aspect of the present invention, in the retrieval system as described in any one of the first to fifth aspects, it may be configured so that a criterion for establishing the machine of any user as a search target, or a criterion for establishing the machine of any location as a search target, is included in the search criteria, in a case of a plurality of users utilizing the machine in a plurality of locations.

According to a seventh aspect of the present invention, in the retrieval system as described in any one of the first to sixth aspects, it may be configured so that the information representing the operating state includes any one or a combination of information related to an operation status of the machine, information related to a load applied to the machine, and information related to a surrounding environment of the machine.

A retrieval method according to an eighth aspect of the present invention performed by a computer (e.g., the retrieval system 1 described later) includes the steps of: acquiring, from a plurality of machines (e.g., the machine 25 described later) utilized under respectively different operation conditions, information representing an operating state of each of the plurality of machines; accumulating the information representing a plurality of the operating states thus acquired in an accumulation means; and accepting search criteria for searching the information accumulated in the accumulation means, retrieving information representing an operating state agreeing with the search criteria from the accumulation means, and outputting a search result.

According to the present invention, it becomes possible to retrieve and output information representing operating states of each of a plurality of robots, etc. operating under different operation conditions.

DETAILED DESCRIPTION OF THE INVENTION

First, an outline of an embodiment of the present invention will be explained. An embodiment of the present invention constructs a machine information database for identifying each robot, etc. upon installation of the robots, etc. into the factory of the client. Subsequently, the operating conditions of each of the robots, etc. are managed with the management system of each factory, in association with this identification information. In addition, a central management device connected to the management system of each factory acquires information representing the operating conditions of the device which is a maintenance target periodically from each factory, and constructs a statistical information database from the acquired information. Furthermore, when the maker's designer inputs search criteria for acquiring the desired operating information, the statistical information database is searched based on these search criteria, and the operating information agreeing with the search criteria is outputted.

In other words, according to the present embodiment, it is possible to solve the aforementioned problem of "searching operating conditions for each of a plurality of robots, etc. operating under different operation conditions".

In addition, the maker's designer can understand how the robots, etc. are actually used in the client's factory by referencing this outputted operating information. Then, it is possible to make use in the improvement of a current model of robots, etc., or in the design of a future model of robots, etc. The above is a summary of the present embodiment.

Figure 1:
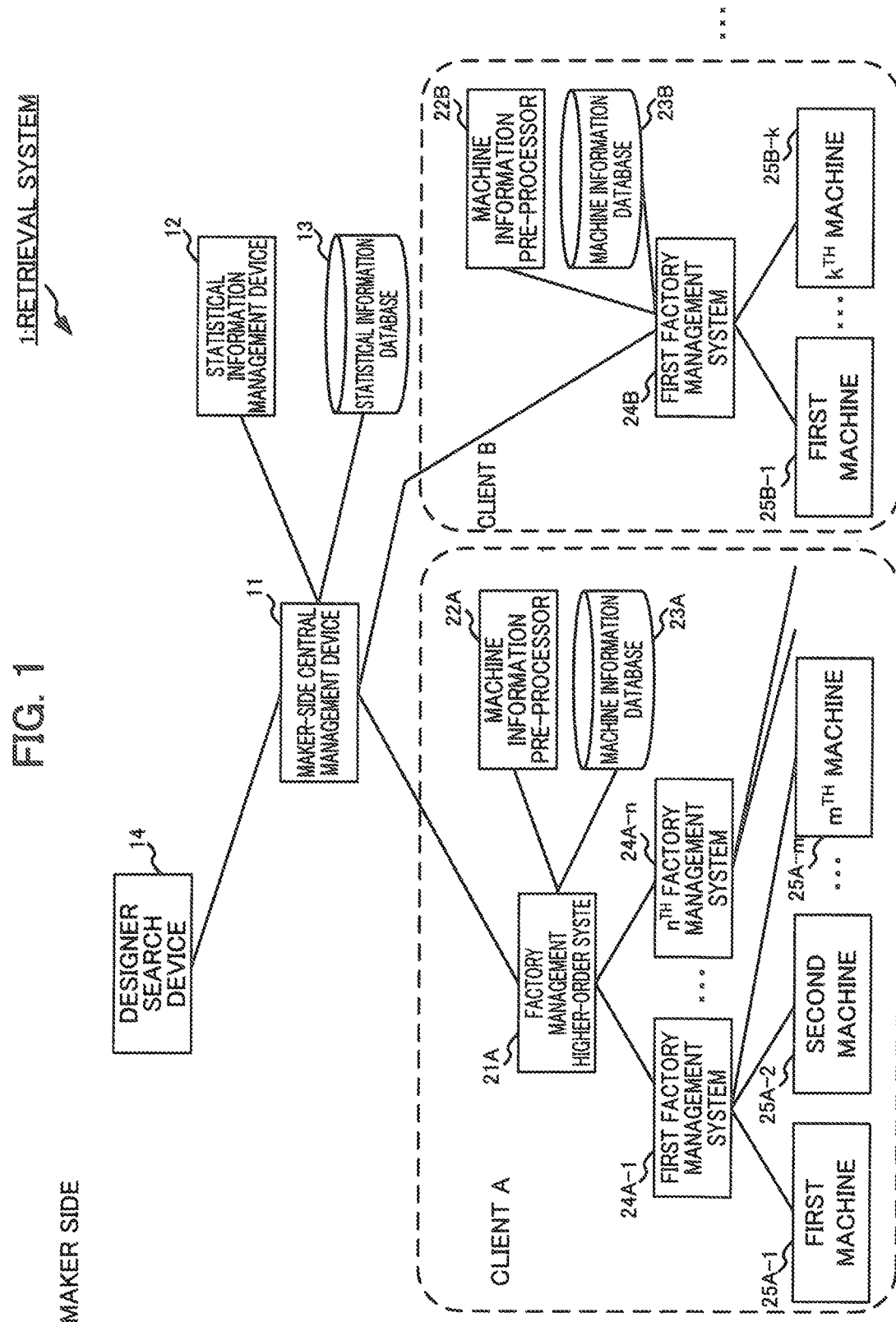
FIG. 1 is a block diagram showing a basic configuration of an overall embodiment of the present invention.

Next, an embodiment of the present invention will be explained in detail by referencing the drawings. First, an explanation will be made for the overall configuration of the present embodiment by referencing FIG. 1. As shown in FIG. 1, a retrieval system 1 that is the present embodiment includes a maker-side central management device 1, statistical information management device 12, statistical information database 13, and designer search device 14. These are systems used by the maker, which is the manufacturer of the industrial robot and/or machine tool.

In addition, the retrieval system 1 further includes a factory management higher-order system 21A, machine information pre-processor 22A, machine information database 23A, plurality of factory management systems 24A, and plurality of machines 25A. These are systems used by a client A which is the client using the machine tool.

Furthermore, the search system 1 further includes a machine information pre-processor 22B, machine information database 23, plurality of factory management systems 24B, and a plurality of machines 25B. These correspond to systems used by a client B which is the client using the machine tool.

It should be noted that, in the drawings, n, m and k at the end of the reference symbols for the $n^{th}$ factory management system 24A-n, $m^{th}$ machine 25A-m, and $k^{th}$ machine 25A-k each represent arbitrary natural numbers. In other words, in the present embodiment, the numbers of respective systems and respective devices can be arbitrarily decided.

In addition, in the drawings, although only one designer search device 14 is illustrated, a plurality of designer search devices 14 may be present. In addition, the systems used by client A and client B are shown; however, systems used by other clients than client A and client B may also be present.

Each of the machines 25 is a device such as an industrial robot or machine tool installed in the factory. Each of the machines 25 includes a special operation processing device and/or storage device, and I/O device for an operator, etc., and can be controlled by software. It should be noted that, in the drawings, although each machine 25 is represented by one functional block, each machine 25 may be a combination of a plurality of devices such as a combination of an industrial robot or machine tool, and a numerical control device for controlling these.

Each machine 25 is used under respectively different operation conditions, from various clients. In addition, even if the same client, the operation conditions may differ if the factory or line is different. For example, the target moved by the arm of an industrial robot differs, the target machined with a machine tool differs, and the moving frequency differs. With the present embodiment, a database is constructed by storing the operating information of each machine 25 used under such respectively different operation conditions as statistical information, and this database is defined as the search target.

In addition, each machine 25 includes various sensors in its own mechanical unit, drive unit or control unit. For example, an encoder for measuring the position on each axis is included in each motor. Based on the position on each axis measured by this encoder, it is possible to calculate the speed and/or acceleration of each axis. In addition to this, an amperometer, voltmeter, etc. for measuring the torque of each motor are included, for example. Furthermore, it is possible to arrange a load sensor, acceleration sensor, or external temperature sensor, etc. as necessary.

Then, each machine 25 creates information related to the operating conditions of each machine 25 (hereinafter referred to as "operating information") based on the measured values, etc. of these sensors.

In addition, each machine 25 performs communication reciprocally with the factory management system 24 installed in the same factory, via a network such as LAN (Local Area Network), etc. established in the factory. For example, each machine 25 sends operating information for itself to the factory management system 24 periodically.

The factory management system 24 is installed in the factory, and is a system that manages each machine 25 in the factory in which itself is installed. The factory management system 24 acquires identification information of each machine 25, upon each machine 25 being installed. Then, the acquired identification information of each machine 25 is stored in the machine information database 23. In addition, the factory management system 24 acquires the operating information periodically from each machine 25. Then, the acquired operating information is stored in the machine information database 23 in association with the identification information of each machine 25.

It should be noted that, in the case of the scale of the factory being large, a plurality of factory management systems 24 may be installed in one factory. In addition, a factory management system 24 may be installed in each of a plurality of factories, which are at locations remote from one client. In such a case, it may be configured so as to specially provide a higher-order management system, in order to collectively manage information acquired by a plurality of factory management systems 24.

For example, client A provides the factory management higher-order system 21, in order to collectively manage the information acquired by the first management system 24A-1, . . . , $n^{th}$ management system A-n installed in the respective factories owned by themselves. In a case of the factory management higher-order system 21 being present in this way, the factory management higher-order system 21 acquires identification information and operating information from each factory management system 24, and stores the respectively acquired information in the machine information database 23.

In any case, for each client, the machine information database 23 is constructed by information being stored for each of the respective machines 25 possessed by the client. A specific example of information stored in this machine information database 23 will be explained.

First, as identification information of each machine 25, the factory name to which each machine 25 belongs, line name, machine number in the line, machine name, date on which first operated, etc. are stored in the machine information database 23. This identification information is inputted to each machine 25 and/or factory management system 24 by the operator during installation of each machine 25.

Next, an explanation will be made for operating information stored in association with this identification information. The operating information includes information itemized below, for example.

<Example of Operating Information>
Operating accumulated time (accumulation of operating time each day)
weighted value of load at drive unit (average value, maximum/minimum value)
processing program name (spot welding, arc welding, painting, etc.)
operating state (operating time every day, cycle number (number of executed processing programs), etc.)
temperature information every day of each drive unit (e.g., motor) and within control device (average value, maximum/minimum value)
drive information every day of each drive unit, e.g., if drive unit is a motor, torque information of motor (maximum torque value, cumulative torque value (value from time-integrating torque value which varies minute by minute), torque curve)
duty cycle of every motor, in case of drive unit being motor
qualities of supply voltage, etc. to machine (voltage, frequency, voltage fluctuation)
temporal change of aforementioned respective information, e.g., when finally executing a certain program, operation information of every minute from start to finish (position/speed/acceleration data, current value of each motor or torque curve, etc.)
maintenance history information (maintenance component name of maintenance component replaced in maintenance, date and time of replacing maintenance component, etc.)

As a specific example, in the case of the machine 25 being an injection molding machine, for example, the number of shots since operation start, maximum current value of motor driving the injection screw during injection, maximum current value of motor driving the clamping mechanism during clamping, maximum current value of motor driving ejector shaft, maximum current value during measurement of motor rotationally driving the screw, peak injection pressure, current cycle time of one molding cycle, measurement time, injection time, further maintenance history information, etc. are included in the operating information.

In addition, the factory management higher-order system 21 or factory management system 24 communicably connects with the maker-side central management device 11 via a WAN (Wide Area Network) outside the company such as the Internet. It should be noted that, with the communication connection, since information related to clients such as operating information of the factory is transmitted, it is preferable to ensure security by using technology such as a VPN (Virtual Private Network).

The respective machine information pre-processor 22 sends the respective information stored in the machine information database 23 to the maker-side central management device 11 via the factory management higher-order system 21 or factory management system 24. Frequency at which this sending is performed is arbitrarily settable. For example, it is possible to perform at a frequency such as every day or every few days.

The maker-side central management device 11 stores identification information and/or operating information for the respective factories of each client, received from the respective machine information pre-processor 22 via the factory management higher-order system 21 or factory management system 24.

The statistical information stored in this statistical information database 13 can be acquired and referenced by the designer search device 14 via the maker-side central management device 11. In addition, upon acquisition, it is further possible to make a search based on specific search criteria, via the statistical information management device 12. For example, it is possible to search and acquire the operating information of a specific month of a specific machine model of a specific client.

The statistical information management device 12 searches statistical information stored in the statistical information database 13 based on the search criteria received via the maker-side central management device 11, from the designer search device 14. Then, the statistical information management device 12 sends the statistical information acquired by the search to the designer search device 14, which is the sender of the search criteria via the maker-side central management device 11.

The designer search device 14 is a device used by a user such as the maker's designer. The designer search device 14 searches the statistical information stored in the statistical information database 13 based on the search criteria inputted by the user. Then, the designer search device 14 outputs the statistical information acquired by the search or the operating information included in the statistical information to the user.

For example, it is possible to acquire by searching and output the information established by collecting operating information for all of the respective machines 25 as in (a) described below, based on the search criteria. In addition, by making further limitation by search criteria, it is possible to acquire by searching and output information similar to (a) by limiting to the operating information for not all of the respective machines 25 as in (b) described below, but rather specific respective machines 25.

(a) Operating information such as the average working conditions of respective machines 25 in a certain application (applied load, speed/acceleration, duty ratio, which axis frequency moves, etc.), and the average value, maximum value, etc. of these (b) Operating information of respective machines 25 targeting the information of the above (a) in a specific client, region, etc., such as working conditions of robot by a certain specific client, working conditions in certain factory, working conditions for every region, working conditions for every country, rather than the statistical values for all respective machines 25

It becomes possible for the user referencing this information to more precisely understand the working conditions at which a future similar machine 25 is assumed to be used, and it is possible to make the working conditions assumed upon designing a future robot to be closer to the actual ones. In other words, it is possible to give support for making the design of the machine 25 to be the optimum according to the present embodiment.

Figure 2:
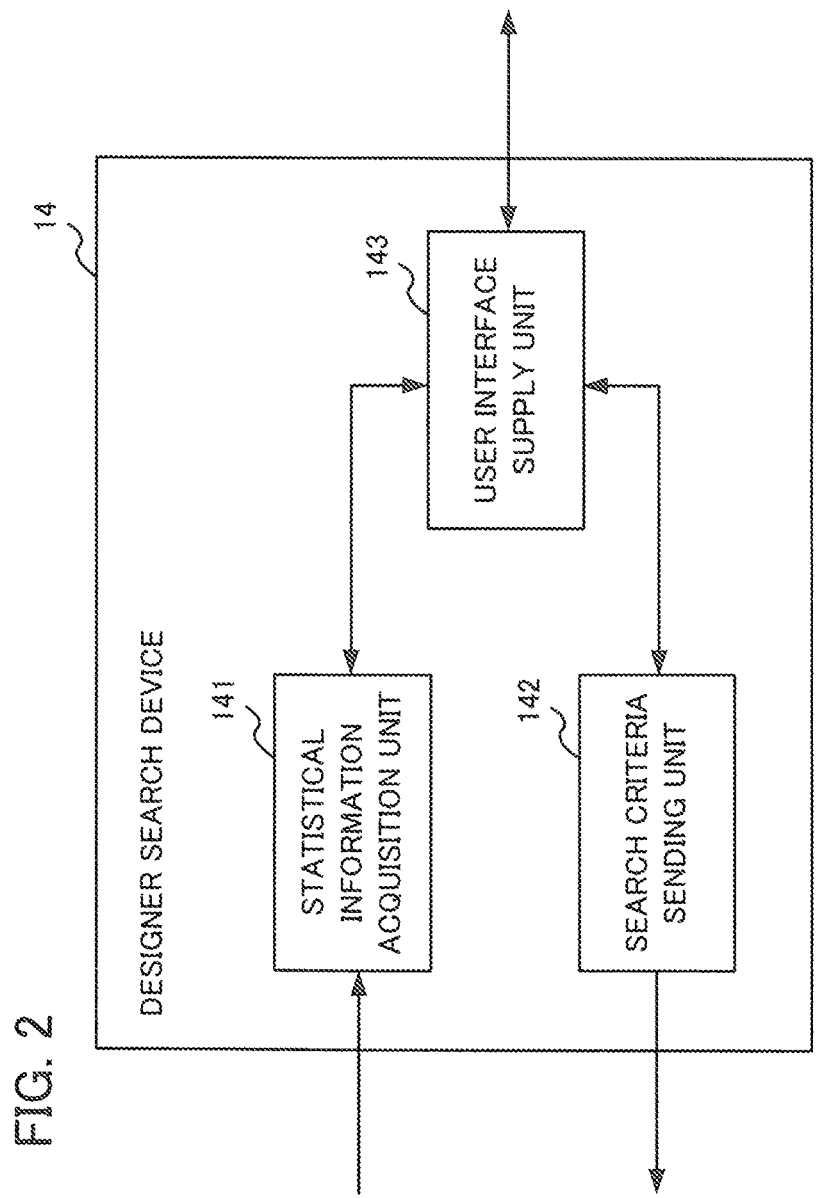
FIG. 2 is a block diagram showing a basic configuration of a designer search device according to an embodiment of the present invention.

Next, an explanation will be made for the specific configuration of the designer search device 14 performing such calculations by referencing the block diagram of FIG. 2. When referencing FIG. 2, the designer search device 14 includes a statistical information acquisition unit 141, search criteria sending unit 142, and user interface supply unit 143.

The statistic information acquisition unit 141 is a portion that receives and acquires statistical information stored in the statistical information database 13. This statistical information is a response to the search criteria sent by the search criteria sending unit 142 described later. The statistical information acquisition unit 141 outputs the acquired statistic information to the user interface supply unit 143.

The search criteria sending unit 142 accepts search criteria inputted by the user on the user interface supply unit 143 from the user interface supply unit 143. Then, the accepted search criteria are sent to the statistical information management device 12. The statistical information management device 12 searches the statistical information stored in the statistical information database 13 based on the received search criteria. Then, the statistical information management device 12 sends the statistical information acquired according to the search to the statistical information acquisition unit 141.

The user interface supply unit 143 supplies the desired user interface to the user (for example, maker's designer) using the designer search device 14. Then, according to this user interface, the display of information to the user and acceptance of manipulations from the user are performed. For example, the user interface supply unit 143 accepts search criteria for searching statistical information from the user. In addition, the user interface supply unit 143 displays statistical information acquired by the statistical information acquisition unit 141 to the user.

The user interface supply unit 143, for example, is realized by a display device such as a display, and input equipment such as a mouse and keyboard. It should be noted that an example of the user interface supplied by the user interface supply unit 143 will be described later by referencing FIGS. 5, 6 and 7. It should be noted that the user interface supply unit 143 may be configured so as not to only display the statistical information acquired by the statistic information acquisition unit 141, but also make into a data file and output.

The aforementioned designer search device 14 can be realized by incorporating the distinctive software of the present embodiment into a general server device or personal computer.

When explaining in further detail, the designer search device 14 includes an arithmetic processing unit such as a CPU (Central Processing Unit) or the like. In addition, the designer search device 14 includes an auxiliary storage device such as a HDD (hard disk drive) or SSD (solid state drive) storing various programs, and a main storage device such as RAM (Random Access Memory) for storing data that is temporarily necessitated upon the arithmetic processing unit executing a program.

Then, in the designer search device 14, the arithmetic processing device reads out various programs from the auxiliary storage device, and performs the arithmetic processing based on these various programs, while expanding the various programs read out in the main storage device.

Based on this arithmetic processing, the functions of the aforementioned respective functional blocks are realized by controlling the hardware included by the designer search device 14. In other words, the designer search device 14 can be realized by hardware and software cooperating.

Explanations have been made above for the respective functions of each device included in the present embodiment. Next, an explanation will be made for operations of the present embodiment by referencing the flowcharts of FIGS. 3 and 4.

Figure 3:
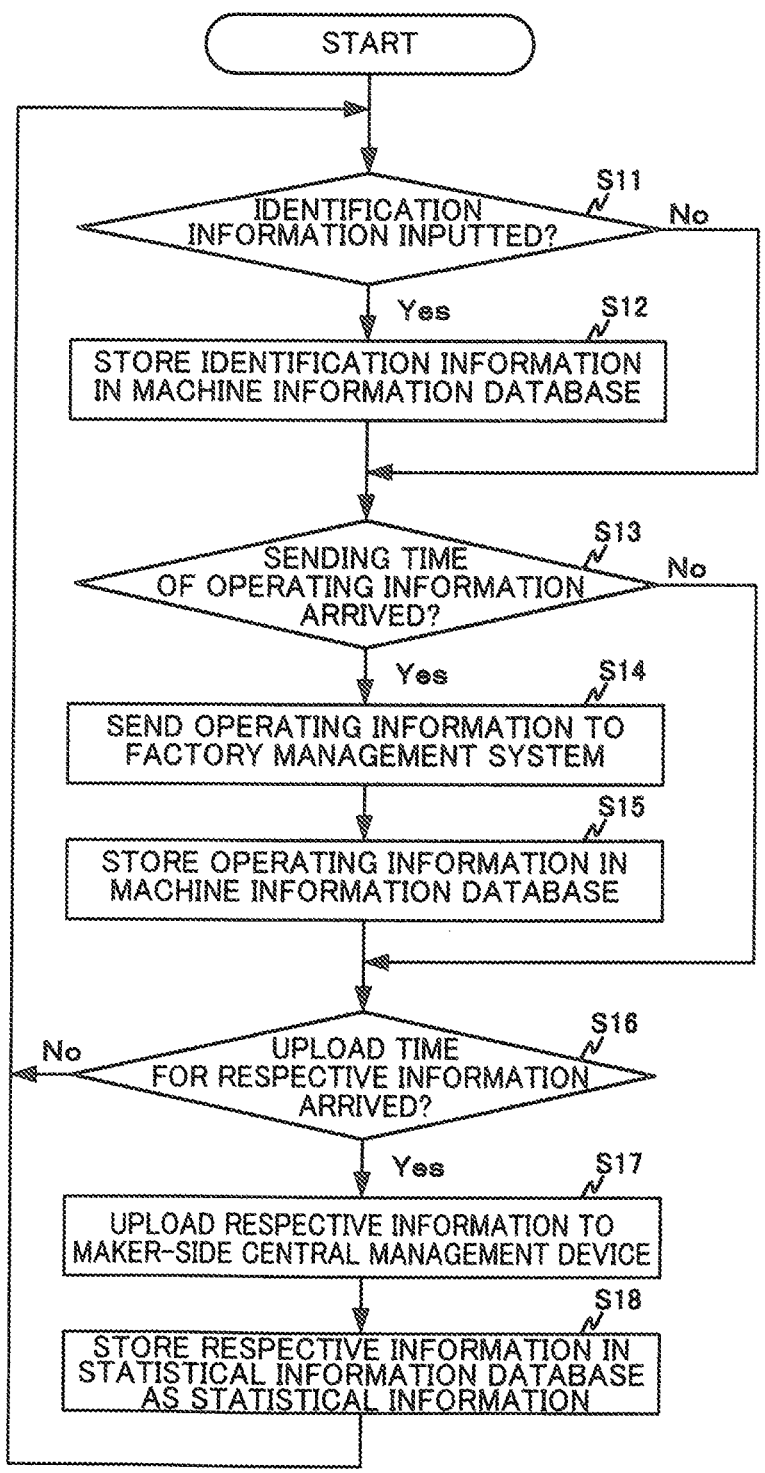
FIG. 3 is a flowchart showing operations from each machine being installed in a factory until statistical information is stored in a statistical information database according to the embodiment of the present invention.

First, an explanation will be made for operations from each machine 25 being installed in a factory until statistical information is stored in the statistical information database 13, by referencing the flowchart of FIG. 3.

The factory management system 24 determines whether the identification information has been newly inputted (Step S11). The input of identification information is performed by the operator during factory installation of each machine 25. It should be noted that input may be performed on each machine 25, or may be performed on the factory management system 24. Assuming a case of being performed on the machine 25, the inputted identification information is sent to the factory management system 24.

The contents of the identification information are the factory name to which the respective machines 25 belong, line name, machine number in the line, machine name, date on which operation started, etc., as mentioned above. It should be noted that, among this information, for example, the factory name, line name, etc. may be registered in advance in the factory management system 24 prior to installation of each machine 25.

In the case of identification information being newly inputted (YES in Step S11), the factory management system 24 stores the inputted identification information in the machine information database 23 (Step S12). Then, the processing advances to Step S13. On the other hand, in the case of there not being a new input of identification information (NO in Step S11), the processing advances to Step S13 without performing Step S12.

It should be noted that the present flowchart is for explaining solely the processing related to storage of identification information and operating information; therefore, although not particularly illustrated, in parallel with processing of the present flowchart, each machine 25 makes operations in the respective factories and each continues recording of its own operating information.

In Step S13, each machine 25 determines whether the time at which to send operating information to the factory management system 24 has arrived. Herein, although it is possible arbitrarily decide the time at which to send the operating information, for example, 0 hours in the morning every day is decided as the time to send the operating information.

In the case of the time at which to send the operating information having arrived (YES in Step S13), each machine 25 sends its own operating information to the factory management system 24 (Step S14). Then, the factory management system 24 having received the operating information from each machine 25 stores the received operating information in the machine information database 23 (Step S15). Then, the processing advances to Step S16.

On the other hand, in the case of the time at which to send the operating information to the factory management system 24 not having arrived, i.e. in the case of not being the time at which to send the operating information yet (NO in Step S13), the processing advances to Step S16 without performing Step S14 or Step S15.

In Step S16, the machine information pre-processor 22 determines whether or not the time at which to upload (send) the respective information stored in the machine information database 23 to the maker-side central management device 11 via the factory management system 24 or factory management higher-order system 21 has arrived. Herein, although it is possible to arbitrarily decide the time at which to upload the operating information, it is configured so that each machine 25 sets a time after sending the operating information to the factory management system 24. For example, in a case of setting the time at which to upload the operating information for determination in Step S13 as 0 hours in the morning every day, it is configured so as to be a time after this.

However, it is not necessarily required to perform uploading to the maker-side central management device 11 via the factor management system 24 or factory management higher-order system 21 by the machine information pre-processor 22 at the same frequency as sending of operating information to the factory management system 24 from each machine 25. For example, although sending of operating information to the factory management system 24 from each machine 25 is performed at 0 hours in the morning every day, it may be configured so as to make uploading to the maker-side central management device 11 via the factory management system 24 or factory management high-order system 21 by way of the machine information pre-processor 22 at a frequency of once in three days, etc.

It should be noted that it may be configured so that the machine information pre-processor 22 does not make an upload by performing determination as to whether or not the time at which to upload has arrived, but rather the machine information pre-processor 22 makes an upload in response to the request via the factory management system 24 or factory management higher-order system 21 from the maker-side central processing device 11.

In the case of the time at which to upload the respective information stored in the machine information database 23 having arrived (YES in Step S16), the machine information pre-processor 22 uploads the respective information stored in the machine information database 23 to the maker-side central management device 11 via the factory management system 24 or factory management higher-order system 21 (Step S17). The maker-side central management device 11 receives this respective information, and stores as statistical information in the statistical information database 13 (Step S18). Then, the processing returns to Step S11, and repeats.

On the other hand, in the case of the time at which to upload the respective information stored in the machine information database 23 not having arrived, i.e. in the case of not becoming the time at which to make an upload yet (NO in Step S16), the processing returns to Step S11 and repeats without performing Step S17 or Step S18.

The above are the operations from the respective machines 25 being installed in the factory until the statistical information being stored in the statistical information database 13. It should be noted that in the case of the factory management higher-order system 21 managing a plurality of the factory management system 24 being present, the operations in the aforementioned flowchart for which the factory management system 24 is the main constituent are performed by the factory management higher-order system 21 becoming the main constituent.

Next, an explanation will be made in more detail for the upload in Step S17. In the present embodiment, uploading is performed by either of two methods among an on-demand method and a non-on-demand method.

Herein, the on-demand method is a method in which the maker-side central management device 11 obtains operating information decided in advance from the factory management system (from the machine information pre-processor 22) of the client periodically. In other words, it is a method where the maker-side central management device 11 becomes the main constituent and is dynamically performed. In the case of the on-demand method, it is possible to flexibly designate and request information necessitated by the maker-side central management device 11. For example, it is possible to request operating information such as that mentioned above as <example of operating information>. Therefore, more meticulous analysis of the operating information becomes possible.

In contrast, the non-on-demand method is a method whereby the machine information pre-processor 22 uploads the operating information decided in advance periodically to the maker-side central management device 11. In other words, it is a method in which the machine information pre-processor 22 becomes the main constituent and is dynamically performed. For a reason in terms of security, the access (demand) from outside may be prohibited by the client, and in this case, the non-on-demand method is utilized. In the case of the non-on-demand method, only information decided based on the consent of the client in advance will be uploaded.

In this case, meticulous handling as in the on-demand method is difficult. In this case, as an alternative, for example, it may be configured so that the machines 25 in the factory set a method such as periodically uploading the execution data of the program selected randomly upon consent with the client, and obtain the execution data of the program selected randomly from a plurality of machines 25. If done in this way, although time is required when compared with the on-demand method, if accumulating operating information by such a method in long term manner, it becomes possible to obtain execution data examples of programs having the average or maximum value for a sought application.

In addition, uploading is performed to the maker-side central management device 11; however, there is a limit to the storage capacity of the statistical information database 13 storing the operating information uploaded by this maker-side central management device 11. Therefore, even if either of the on-demand method and non-on-demand method, in the case of there being a plurality of a certain model of machine 25 in this factory, it may be configured so as to statistically upload the operating information of each of the plurality of machines 25 collectively. For example, as described in <example of statistical information to upload> below, the average value for the values of the respective operating information of the plurality of machines 25 is uploaded. Alternatively, the maximum value or only the initial value for the values of the respective operating information of the plurality of machines 25 is uploaded. It is thereby possible to reduce the data volume sent to the service center central management device 11. Therefore, it is possible to also reduce the data volume stored in the statistical information database 13.

<Example of Statistical Information to Upload>
number of plurality of machines 25
average operating time of plurality of machines 25
average cycle number (number of executed programs) of plurality of machines 25
operating conditions of separate motors possessed by each of plurality of machines 25, e.g., torque information (accumulated torque average value, maximum torque value), duty cycle information
temperature information within factory (average value, maximum/minimum values)
temperature information within control device (average value, maximum/minimum values)

However, in the case of there being surplus in the bandwidth in the communication pathway between the machine information pre-processor 22 and service center central management device 11, or the storage capacity of the statistical information database 13, it may be configured so as to upload all of the operating information of each of the plurality of machines 25. In addition, in the case of there not being a surplus in the storage capacity of the machine information database 23, it may be configured so as to also set the information stored in the machine information database 23 to an average value or the like for the value of respective operating information of the plurality of machines 25, and not to store all of the operating information for each of the plurality of machines 25.

Uploading of statistical information has been explained above. Next, an explanation will be made for operations during searching using the designer search device 14 by referencing the flowchart of FIG. 4.

First, the user interface supply unit 143 displays the user interface in order to accept search criteria from the user (Step S21).

Next, the user interface supply unit 143 accepts the search criteria for retrieving statistical information from the user on the user interface (Step S22). The accepted search criteria are outputted to the search criteria sending unit 142.

In the present embodiment, there is no particular limit to the specific contents of the search criteria, and it is possible to retrieve statistical information stored in the statistical information database 13 by any search criteria. As an example of search criteria, for example, for a specific machine model of a certain client at a certain region for a specific period (capable of several designations), the criteria are the program name for which the motor torque of a certain machine shaft is a maximum, and identification information of the machine executing this. In addition, although it may be configured so that the user selects the search criteria from among criteria set in advance, it may be configured so as to accept text input from the user, and establish the accepted text as the search criteria.

In addition, after acquiring the identification information of a machine satisfying the above-mentioned search criteria by way of performing retrieval according to the above-mentioned search criteria once, it is also considered to further perform retrieval by other search criteria. For example, it is also considered to establish the moment-by-moment operation information from start to finish when finally executing the above-mentioned program (position/speed/acceleration data, current value or torque curve of each motor, etc.) as the search criteria, by a machine having identification information specified by the above-mentioned search criteria.

The search criteria sending unit 142 accepts search criteria from the user interface supply unit 143, and sends the accepted search criteria to the statistical information management device 12 via the maker-side central management device 11 (Step S23).

The statistical information management device 12 receives the search criteria, and searches the statistical information database 13 according to the received search criteria. Then, the statistical information management device 12, as a result of the search, performs determination as to whether or not statistical information agreeing with the search criteria is present in the statistical information database 13 (Step S24).

If statistical information agreeing with the search criteria is present in the statistical information database 13 (YES in Step S24), the statistical information management device 12 extracts this statistical information from the statistical information database 13, and sends to the statistical information acquisition unit 141 via the maker-side central management device 11 (Step S31). The statistical information acquisition unit 141 outputs the received statistical information to the user interface supply unit 143.

The user interface supply unit 143 displays the accepted statistical information to the user (Step S32). It is thereby possible for the user to reference information agreeing with the search criteria inputted by himself/herself.

On the other hand, if statistical information agreeing with the search criteria is not present in the statistical information database 13 (NO in Step S24), the processing advances to Step S25. For example, in consideration of the storage capacity of the statistical information database 13 as mentioned above, in the case of uploading only the statistical information such as the average value for the values of the respective operating information of a plurality of machines 25 into the statistical information database 13, the operating information for each of the machines 25 is not present in the statistical information database 13. For this reason, in a case such that the information agreeing with the search criteria is operating information for a specific machine 25, it will be NO in Step S24, and the processing advances to Step S25. In addition, a case is also considered such that, although statistical information agreeing with the search criteria is present, the statistical information is deleted due to the limitation in the storage capacity of the statistical information database 13. Also in such a case, since statistical information agreeing with the search criteria is not present in the statistical information database 13 (NO in Step S24), the processing advances to Step S25.

Next, the statistical information management device 12 inquires, to the factory management higher-order system 21 (in the case of the factory management higher-order system 21 not being present, the factory management system 24) of the factory agreeing with the search criteria, as to whether or not information agreeing with the search criteria is present in the machine information database 23 (Step S25).

The factory management higher-order system 21 (or factory management system 24) having received the inquiry transfers the inquiry to the machine information pre-processor 22. Then, the machine information pre-processor 22 having received the inquiry searches the machine information database 23 of its own factory according to the search criteria, in order to confirm whether information agreeing with the search criteria is present in the machine information database 23 of its own factory. Then, the machine information pre-processor 22, as a result of searching, performs determination as to whether or not the statistical information agreeing with the search criteria is present in the machine information database 23 (Step S26).

If statistical information agreeing with the search criteria is present in the machine information database 23 (YES in Step S26), the machine information pre-processor 22 extracts this statistical information from the machine information database 23, and sends to the maker-side central management device 11 via the factory management higher-order system 21 (or factory management system 24). The maker-side central management device 11 having received the statistical information sends the received statistical information to the statistical information acquisition unit 141 (Step S31). The statistical information acquisition unit 141 outputs the received statistical information to the user interface supply unit 143.

The user interface supply unit 143 displays the accepted statistical information to the user (Step S32). It is thereby possible for the user to reference information agreeing with the search criteria inputted by himself/herself. On the other hand, if statistical information agreeing with the search criteria is not present in the machine information database 23 (NO in Step S26), the processing advances to Step S27.

In this case, since there will be no operating information agreeing with the search criteria in both Step S24 and Step S26, it is necessary to wait until operating information is newly generated. However, it is also possible that a certain time (e.g., several hours, or several days depending on the case) is required until an operation such that agrees with the search criteria is actually executed. Therefore, the present embodiment makes it possible to make a reservation for the current search. More specifically, the machine information pre-processor 22 sends an inquiry such as whether or not to reserve the current search to the designer search device 14 via the factory management higher-order system 21, etc. (Step S27).

The designer search device 14 displays the contents of the accepted inquiry to the user. The user referencing this selects whether or not to perform reservation for the current search on the user interface. The designer search device 14 having received a selection sends the selection result to the machine information pre-processor 22 via the maker-side central management device 11, etc. Herein, if the user selected not to perform a reservation for the current search (NO in Step S28), the processing concerning the current search ends. On the other hand, if the user selected to perform a reservation for the current search (YES in Step S28), the processing advances to Step S29.

In Step S29, the machine information pre-processor 22 outputs, to the machine 25 agreeing with the search criteria, in the case of performing operation such that agrees with the search criteria next, a request via the factory management higher-order system 21 or factory management system 24 so as to record and send the operating information agreeing with the search criteria (Step S29). For example, in the case of performing an operation with a program (application) agreeing with the search criteria, a request is outputted to the machine 25 having identification information agreeing with the search criteria so as to record and send the operating information agreeing with the search criteria. As it were, the operating information agreeing with the search criteria is reserved in the machine 25 agreeing with the search criteria.

It should be noted that, in this case, if continuing a session for the current search criteria between the designer search device 11 and machine information pre-processor 22, the communication bandwidth of the network and/or resources of each device for relaying communication are consumed due to continuing the session between both devices. For this reason, at this stage, it may be configured so as to end the session for the current search criteria between the designer search device 14 and machine information pre-processor 22.

The machine 25 having received a request performs determination as to whether an operation such that agrees with the search criteria has been made (Step S30). If an operation such that agrees with the search criteria has not been made (NO in Step S30), the operations are recorded as normal, without sending, etc. being performed in particular.

On the other hand, if an operation such that agrees with the search criteria has been made (YES in Step S30), the machine 25 records the operating information agreeing with the search criteria, and sends as a response to the request in Step S27 to the machine information pre-processor 22 via the factory management higher-order system 21 or factory management system 24. The machine information pre-processor 22 having received the operating information agreeing with these search criteria sends the received operating information agreeing with the search criteria to the maker-side central management device 11 via the factory management higher-order system 21 or factory management system 24. The maker-side central management device 11 having received the operating information agreeing with the search criteria sends the operating information agreeing with the received search criteria to the statistical information acquisition unit 141 (Step S31). The statistical information acquisition unit 141 outputs the received statistical information to the user interface supply unit 143. It should be noted that, in the case of a reservation being made for the current search between the designer search device 14 and machine information pre-processor 22 as mentioned above, the machine information pre-processor 22 configures so as to generate a notification (e.g., e-mail) for making contact to the user, in the case of having received operating information agreeing with the search criteria. Then, the machine information pre-processor 22 sends the generated e-mail to the predetermined destination (e.g., user's email address) via the factory management system 24, etc. It is thereby possible for the user to recognize that an operation agreeing with the reserved search criteria has been performed. It should be noted that it may be configured so that the user's e-mail address is inputted by the user upon the selection of whether or not to perform reservation in Step S28, for example. Then, in the case of the user inputting information included in the e-mail (e.g., ID of reserved search criteria) to the user interface supply unit 143, it may be configured so as to establish the session again and perform Step S31.

The user interface supply unit 143 displays the statistical information thus accepted to the user (Step S32). It is thereby possible for the user to reference information agreeing with the search criteria inputted by himself/herself. Herein, although depending on the contents of the search criteria, the statistical information thus accepted may become extensive, consisting of a collection of data of thousands of items. In such a case, it may be configured so as to output the data of these thousands of items as a data file. The output destination of the data file, for example, may be set as a storage device within the designer search device 14, or an external recording device connected to the designer search device 14. In addition, it may be configured so as to send to devices other than the designer search device 14 (e.g., maker-side central management device 11) via a network. The user can understand how each machine 25 is actually being used in the factory of the client, by analyzing the data of thousands of items included in this data file. Then, these understood contents can be put to use in the improvement of the machine 25 of the present model, or design of a machine 25 for a future model.

Operations of the present embodiment have been explained above. According to the aforementioned operations, it is possible to search operating conditions of each of the respective machines 25 operating under different operating conditions, and display information agreeing with the search criteria to the user with the present embodiment.

In addition, even in a case of information agreeing with the search conditions not being present in the statistical information database 13 which is the higher-order layer (NO in Step S24), it is possible to search the machine information database 23 which is a lower-order system (Step S25 and Step S26). Furthermore, even in a case of information agreeing with the search criteria not being present in the machine information database 23 which is the lower-order system (NO in Step S26), it is possible to acquire information agreeing with the search criteria by outputting a sending request to the machine 25 and establishing in standby (Steps S27 to S29). In other words, the present embodiment makes it possible to obtain the necessary information by outputting the request received at the higher-order layer to the lower-order system in order.

Next, an explanation will be made for the user interface upon executing Step S21 to Step S32 by referencing drawings representing examples of the user interfaces in FIGS. 5, 6 and 7. First, an explanation will be made for the user interface for performing acquisition of statistical information in Step S21.

As mentioned above, by utilizing the statistical information management device 12 in the present embodiment, it is possible to flexibly designate search criteria for retrieving statistical information stored in the statistical information database 13. More specifically, it is possible to designate a plurality of attributes (properties) defined by each machine 25 or each service part and the value thereof, and designate matter satisfying all of these ("AND" condition), matter satisfying any one among these ("OR" condition), and a combination of "AND" and "OR".

What is used in this designation is "search criteria input". If clicking the "+" mark prior to the heading of "search criteria input", the criteria input screen is enlarged, and it is possible to input various criteria. In addition, if clicking this when there is a "−" mark prior to the heading of "search criteria input", the criteria input screen will be minimize and no longer be visible.

(For items with a "+" or "−" mark, it is possible to switch the screen similarly between maximize and minimize in the same way below.)

Next, an explanation will be made for each item.

1. "property selection" can select one from the attributes defined in each machine or service part, by way of a drop-down menu.

2. "matching criterion" can select criteria such as only perfectly matching matters, including/not including text designated, value equal to/larger than/smaller than designated value.

3. "value input item" can designate search criteria by text input or numerical value input.

4.

In addition, is considered as matching when all criteria designated by one "search criterion" are satisfied ("AND" condition). By clicking the plus mark of "criteria addition", it is possible to add any number of criteria in one "search criterion".

It is also possible to define a plurality of "search criterion" defined in this way. More specifically, by clicking the plus mark of "search criteria addition", it is possible to newly add "search criterion". When there is a plurality of "search criterion" (e.g., "search criterion" No. 1, No. 2, etc.), it is regarded as matching when any one thereamong is agreeing. In other words, the determination as to whether or not agreeing when there is a plurality of "search criterion" is treated as an "OR" condition.

If the designation of all criteria could be done, when the button "search start" is pressed, all data satisfying the designated criteria are displayed as "search results".

An explanation will be made for the display of "search results" by referencing FIG. 6. Presently, the identification information of the machine 25 searched is shown as "search result" based on the search criteria in FIG. 5. As illustrated, a list of identification information of the machines 25 agreeing with the search criteria is shown as the search result.

Next, it is possible to demand statistical data for a series of these robots. For this reason, the statistical data calculation item is displayed to be enlarged by pressing the "+" button, which is prior to the heading of "statistical data calculation".

An explanation will be made for the statistical data calculation screen which is the screen displayed to be enlarged by referencing FIG. 7. On the statistical data calculation screen, the value of which statistical information (property) is wanted to be known for the machine 25 shown by list as in FIG. 6 is selected. For example, it is selected from among various values (e.g., torque, speed, output, etc.) of each motor, or operating time, duty ratio, failure frequency of specific component, etc.

In addition, by designating an operation such as what kind of computation (statistical operation) is wanted to be conducted on this selected data (e.g., average value, maximum value/minimum value and for which machine this is recorded), and pressing the "calculation start" button, the result thereof is displayed.

The user can also perform a search from yet other viewpoints upon referencing the results. For example, in a one-time search, the identification information of a machine 25 having a very high failure frequency of a specific component is specified by the search. Then, by inputting the identification information of the machine 25 having a very high failure frequency of a specific component, it is possible to display various values of each motor of this machine 25, duty ratio, or applied load, along a time series. The user can probe for the cause of a failure occurring, by referencing this information. In addition, it is also possible to design a new machine 25 by configuring so as to be able to eliminate this cause.

In the present embodiment explained above, it is possible to search the operating conditions of each of the respective machines 25 operating under different operating conditions, and display information agreeing with the search conditions to the user. The effect is thereby exerted of being able to provide actual operating information of the machine 25 operating in an actual factory to the designer of the machine 25, for example. It is thereby possible for the designer to design a machine having a good balance with optimum performance, according to individual applications.

Figure 5:
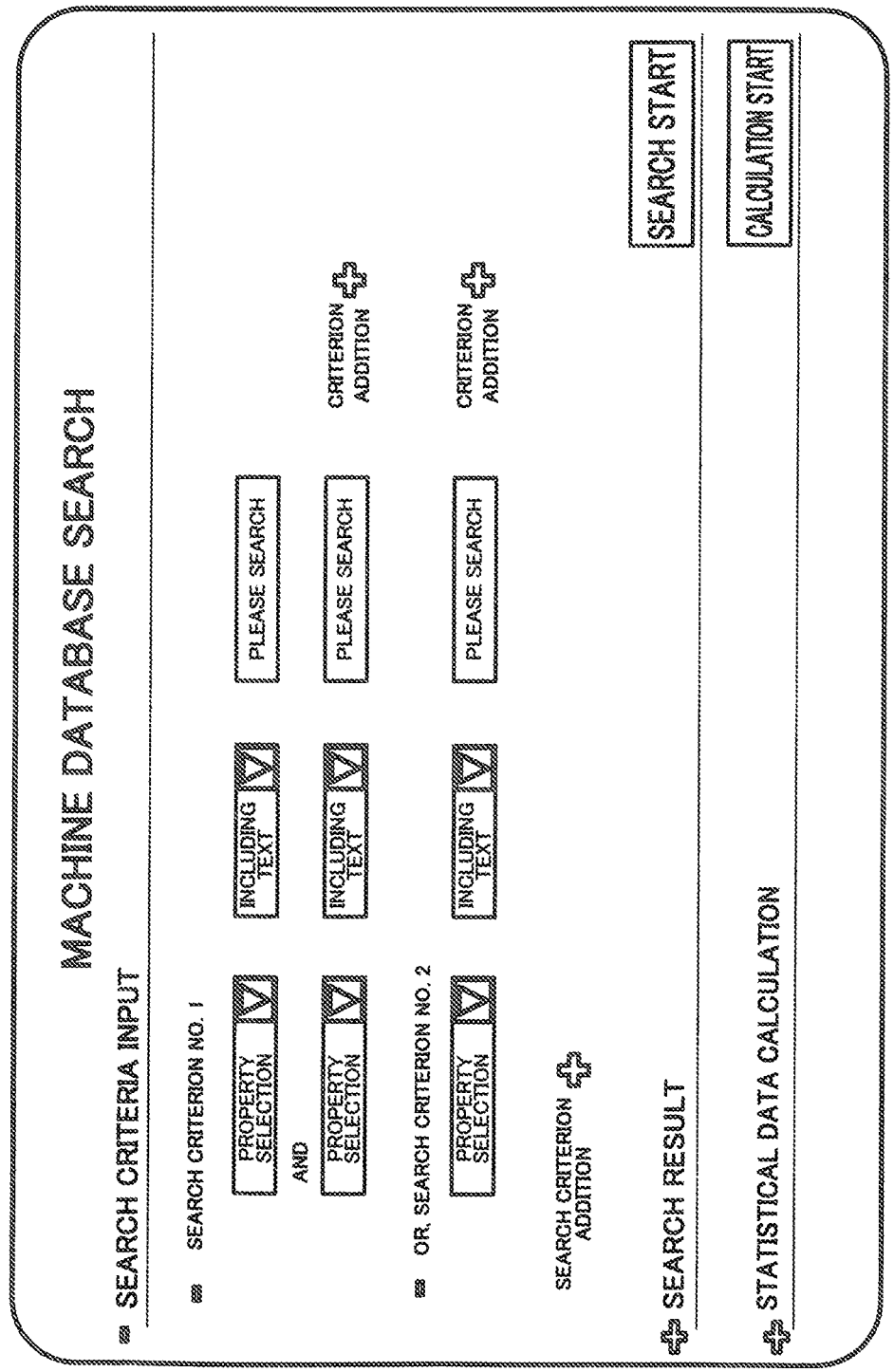
FIG. 5 is a view (1/3) showing an example of a user interface according to the embodiment of the present invention.
Figure 6:
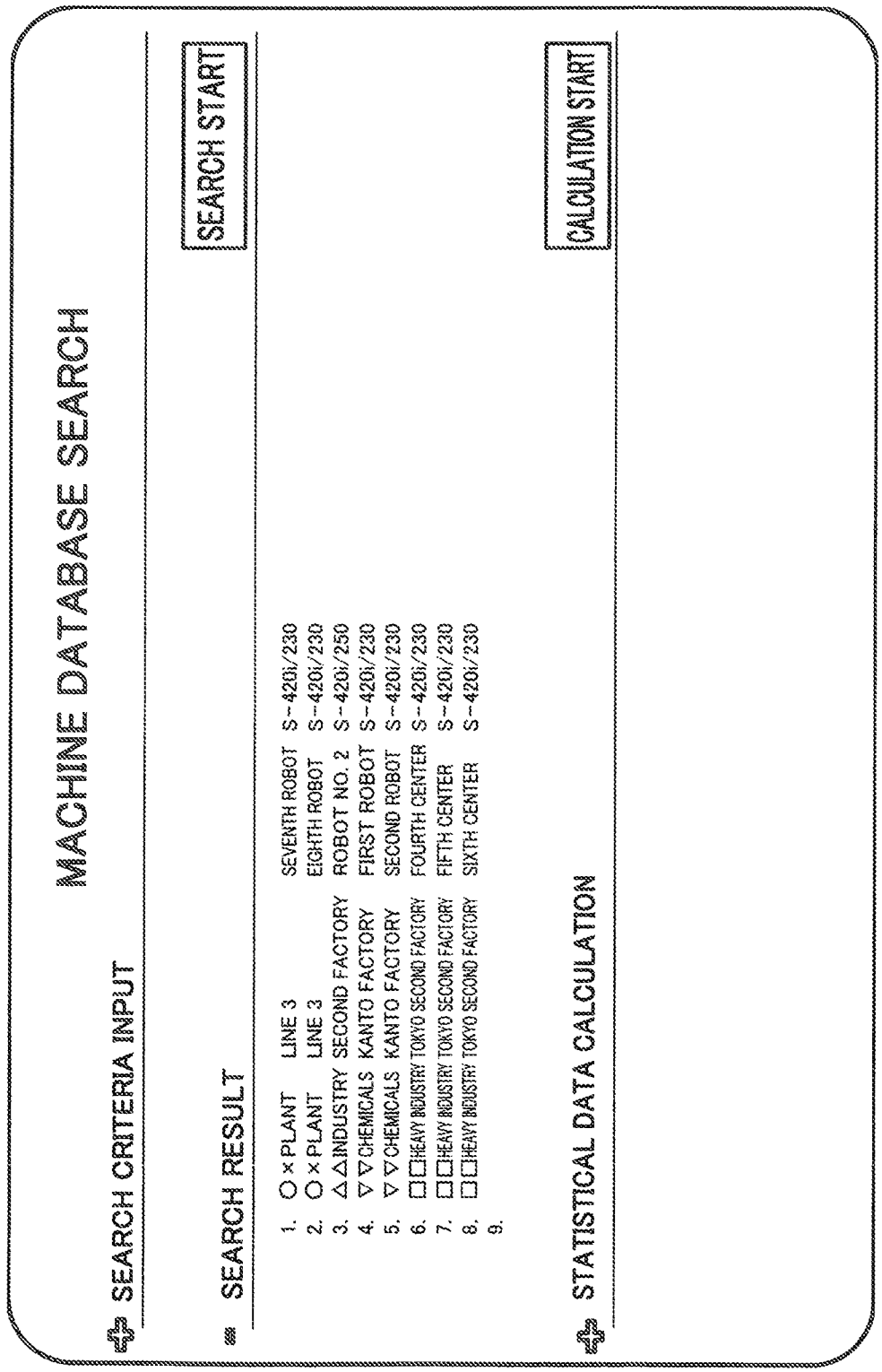
FIG. 6 is a view (2/3) showing an example of a user interface according to the embodiment of the present invention.
Figure 7:
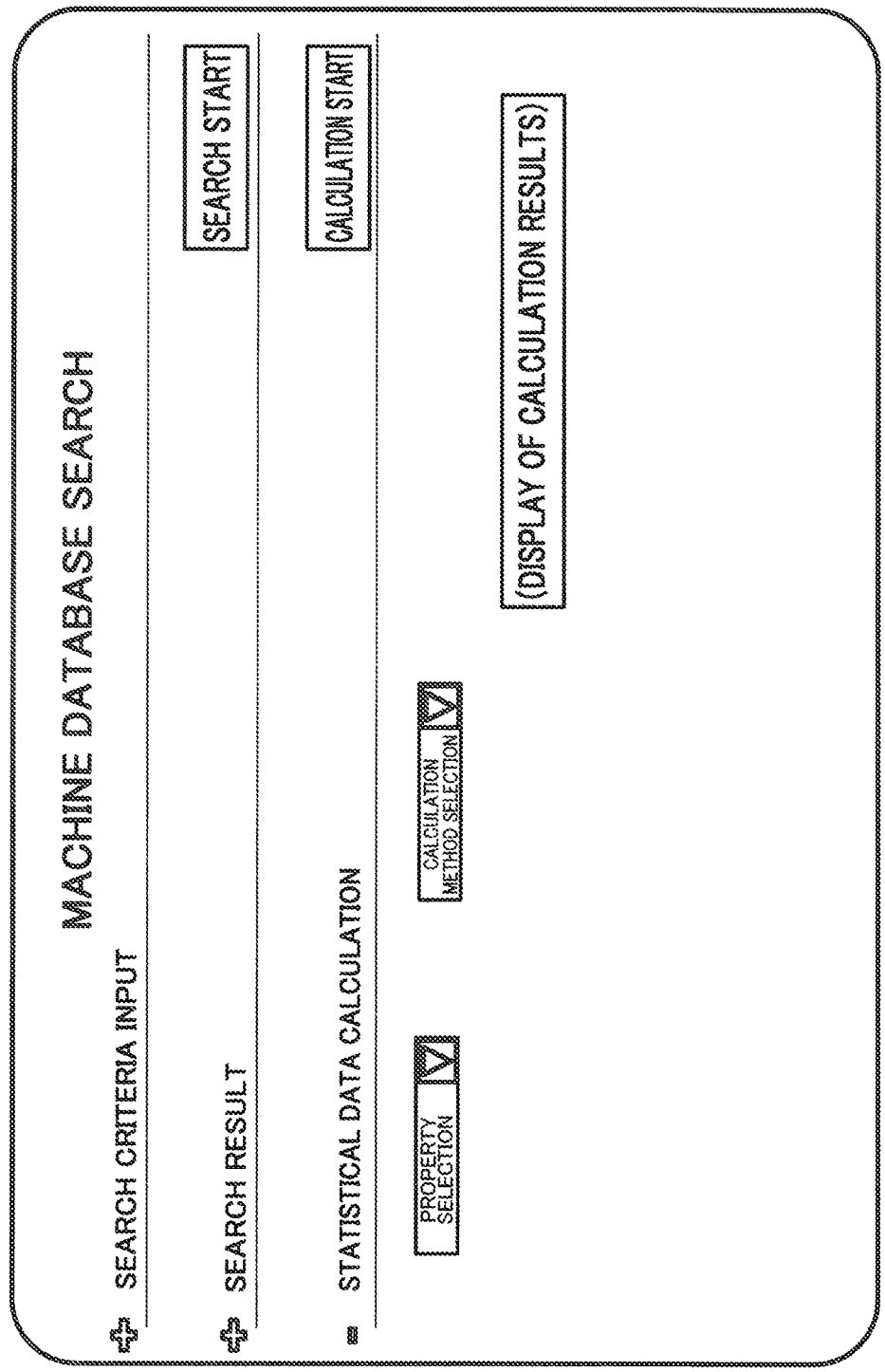
FIG. 7 is a view (3/3) showing an example of a user interface according to the embodiment of the present invention.

In addition, with the present embodiment, it is possible to flexible change the search criteria according to the desire of the user, as the present embodiment is explained referencing FIGS. 5, 6 and 7. The effect is thereby exerted in that the user can selectively obtain the information desired by himself/herself.

Figure 4:
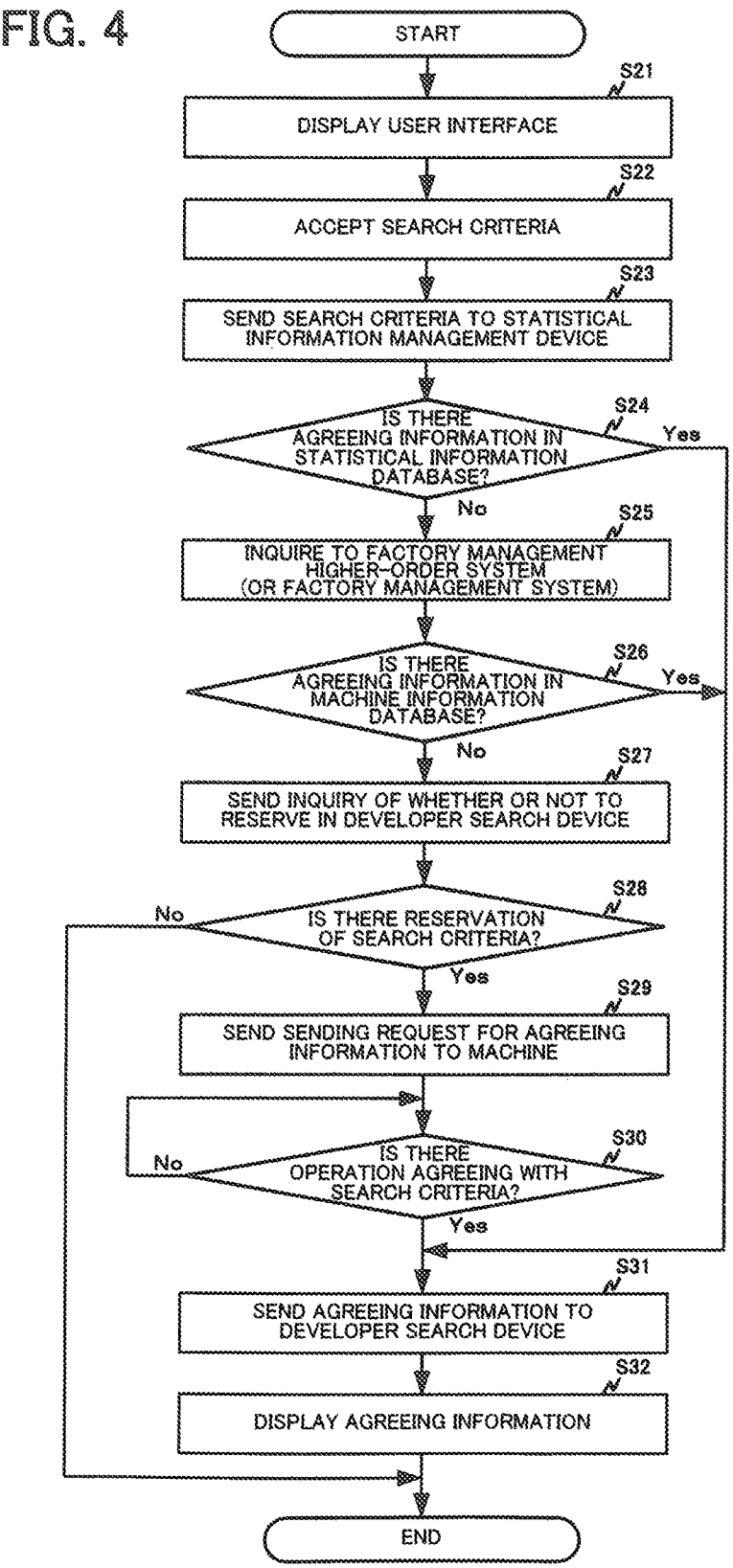
FIG. 4 is a flowchart showing operations during retrieval according to the embodiment of the present invention.

In addition, as explained by referencing the flowchart of FIG. 4, the present embodiment also exerts the effect in that it is possible to obtain the necessary information, by outputting a request to a lower-order system in order, even in a case of information agreeing with the search criteria not being present in the statistical information database 13 which is a higher-order layer.

It should be noted that each of the respective devices included in the above-mentioned retrieval system can be realized by hardware, software, or a combination of these. In addition, the search method carried out by each of the respective devices included in the above-mentioned retrieval system can also be realized by hardware, software, or a combination of these. Herein, being realized by software indicates the matter of being realized by a computer reading out and executing programs.

The programs can be stored using non-transitory computer readable media of various types, and then supplied to the computer. Non-transitory computer readable media includes various types of tangible storage media. Examples of non-transitory computer readable media include magnetic media (for example, flexible disk, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)). In addition, the programs may be supplied to the computer by way of various types of transitory computer readable media. Examples of transitory computer readable media include electrical signals, optical signals, and electromagnetic waves. Transitory computer readable media can supply programs to the computer via a wired communication path such as electrical lines and optical fiber, or a wireless communication path.

In addition, although the aforementioned embodiment is a preferred embodiment of the present invention, it is not to limit the scope of the present invention to only the above-mentioned embodiments, and implementation in modes arrived at by conducting various modifications within a scope not departing from the gist of the present invention are possible. For example, it is possible to establish the following such modified examples.

FIRST MODIFIED EXAMPLE

In the aforementioned embodiment, although explained by exemplifying the matter of performing processing with the machine tool, etc. employed in a factory as the target, the present embodiment may be configured so as to perform processing with other machines employed in a location other than the factory as the target.

SECOND MODIFIED EXAMPLE

In addition, it may be configured so as to realize the functions of the plurality of devices included in the above-mentioned embodiment by a single device. For example, it may be configured so as to realize the functions of the maker-side central management device 11 and statistical information management device 12 by a single device. Furthermore, it may be configured so as to realize the functions of the factory management higher-order management system 21 or factory management system 24, and the functions of the machine information pre-processor 22 by a single device. In addition, it may be configured so as to realize the functions of any one device in the aforementioned embodiment by a combination of a plurality of devices.

INDUSTRIAL APPLICABILITY

The present invention is suited to the understanding of operating conditions. For example, it is suited to the understanding of operating conditions such as of a robot in a factory.

EXPLANATION OF REFERENCE NUMERALS

1 retrieval system
11 maker-side central management device
12 statistical information management device
13 statistical information database
14 designer search device
141 statistical information acquisition unit
142 search criteria sending unit
143 user interface supply unit
21 factory management higher-order system
22 machine information pre-processor
23 machine information database
24 factory management system
25 machine

What is claimed is:

1. A retrieval system comprising:
    an acquisition means for acquiring, from a plurality of machines being used under respectively different operation conditions, information representing an operating state of each of the plurality of machines;
    an accumulation means for accumulating information representing a plurality of the operating states thus acquired;
    a search means for accepting search criteria for searching the information accumulated in the accumulation means, retrieving information representing an operating state in a case of the information representing the operating state agreeing with the search criteria from the accumulation means, and outputting a search result, and
    a management means for requesting information representing the operating state, from among the plurality of operating states, agreeing with the search criteria from a machine information database containing information different from the information accumulated in the accumulation means and the plurality of machines, wherein the machine information database is not one of the plurality of machines, in a case of information representing an operating state agreeing with the search criteria not being accumulated in the accumulation means, as a result of a search by the search means.

2. The retrieval system according to claim 1, wherein the management means, in a case of receiving information representing an operating state agreeing with the search criteria as a response to a request from the machine, causes the information representing the operating state to be outputted to the search means.

3. The retrieval system according to claim 2, wherein the machine having received the request from the management means generates information representing an operating state agreeing with the search criteria, based on operation of said machine performed after receiving the request, and sends the operating state thus generated to the management means as a response to the request.

4. The retrieval system according to claim 1, wherein criterion for retrieving information produced by collecting statistics of information representing the operating state from among the plurality of operating states is included in the search criteria.

5. The retrieval system according to claim 1, wherein criterion for retrieving information representing operating information along a time series of a specific machine is included in the search criteria.

6. The retrieval system according to claim 1, wherein a criterion for establishing the machine of any user as a search target, or a criterion for establishing the machine of any location as a search target, is included in the search criteria, in a case of a plurality of users utilizing the machine in a plurality of locations.

7. The retrieval system according to claim 1, wherein the information representing the operating state includes any one or a combination of information related to an operation status of the machine, information related to a load applied to the machine, and information related to a surrounding environment of the machine.

8. A retrieval method performed by a computer, the method comprising the steps of:
    acquiring, from a plurality of machines utilized under respectively different operation conditions, information representing an operating state of each of the plurality of machines;
    accumulating the information representing a plurality of the operating states thus acquired in an accumulation means;
    accepting search criteria for searching the information accumulated in the accumulation means, retrieving information representing an operating state in a case of the information representing the operating state agreeing with the search criteria from the accumulation means, and outputting a search result, and
    requesting information representing the operating state, from among the plurality of operating states, agreeing with the search criteria from a machine information database containing information different from the information accumulated in the accumulation means and the plurality of machines, wherein the machine information database is not one of the plurality of machines, in a case of information representing an operating state agreeing with the search criteria not being accumulated in the accumulation means, as a result of a search by the search means.

* * * * *